US008954179B2

(12) United States Patent
Yokoyama

(10) Patent No.: US 8,954,179 B2
(45) Date of Patent: Feb. 10, 2015

(54) SINE WAVE GENERATING DEVICE, DIGITAL SIGNAL PROCESSOR AND AUDIO OUTPUT DEVICE

(75) Inventor: Yasutomo Yokoyama, Kyoto (JP)

(73) Assignee: Rohm Co., Ltd. (JP)

( * ) Notice: Subject to any disclaimer, the term of this patent is extended or adjusted under 35 U.S.C. 154(b) by 291 days.

(21) Appl. No.: 13/538,271

(22) Filed: Jun. 29, 2012

(65) Prior Publication Data

US 2013/0177161 A1 Jul. 11, 2013

(30) Foreign Application Priority Data

Jun. 30, 2011 (JP) ................................ 2011-146397

(51) Int. Cl.
*G06F 17/00* (2006.01)
*H04R 3/00* (2006.01)

(52) U.S. Cl.
CPC .............. *H04R 3/00* (2013.01); *H04R 2499/11* (2013.01); *H04R 2499/13* (2013.01); *H04R 2499/15* (2013.01)
USPC ........................................ 700/94; 379/406.06

(58) Field of Classification Search
USPC ........................................ 700/94; 379/406.06
See application file for complete search history.

(56) References Cited

U.S. PATENT DOCUMENTS

| | | | | |
|---|---|---|---|---|
| 6,240,434 | B1 * | 5/2001 | Oshio | 708/322 |
| 7,016,487 | B1 * | 3/2006 | Kwon | 379/406.01 |
| 7,424,406 | B2 * | 9/2008 | Nam | 702/190 |
| 2003/0219131 | A1 * | 11/2003 | Akiho | 381/71.14 |
| 2006/0181797 | A1 * | 8/2006 | Sugawara et al. | 360/51 |
| 2006/0209054 | A1 * | 9/2006 | Someya et al. | 345/204 |

FOREIGN PATENT DOCUMENTS

JP 2010-187366 A 8/2010

* cited by examiner

*Primary Examiner* — Creighton Smith
(74) *Attorney, Agent, or Firm* — Cantor Colburn LLP

(57) ABSTRACT

A sine wave generating device includes at least one adder configured to add two input signals thereof, at least one delay unit configured to delay an input signal thereof by one sample time and at least one multiplier configured to receive the delayed signal from the at least one delay unit, multiply the delayed signal by a coefficient and output the multiplied signal to provide to the at least one adder. The coefficient is arbitrarily set from outside the sine wave generating device.

12 Claims, 5 Drawing Sheets

| COUNTER VALUE | DECODE VALUE |
|---|---|
| 0 | 0 |
| 1 | 1 |
| 2 | 0 |
| 3 | -1 |

SINE WAVE GENERATING DEVICE, DIGITAL SIGNAL PROCESSOR AND AUDIO OUTPUT DEVICE

CROSS-REFERENCE TO RELATED APPLICATIONS

This application is based upon and claims the benefit of priority from Japanese Patent Application No. 2011-146397, filed on Jun. 30, 2011, the entire contents of which are incorporated herein by reference.

TECHNICAL FIELD

The present disclosure relates generally to a digital signal processor, and more specifically to a sine wave generating device for generating a sine wave having an arbitrary frequency, and a digital signal processor and an audio output device using the sine wave generating device.

BACKGROUND

Conventionally, in order to output a melody or a beep sound when an audio output device such as a television and an audio device is powered on/off or mode-switched, desired sound data previously stored in a ROM of the audio output device are read from the ROM. This sound data is subjected to a signal processing and then output through a speaker whenever a power on/off or a mode switch button is pressed. As a related technique to the above-described method, an automatic level control (ALC) for automatically controlling a volume of an audio signal is conventionally known.

However, in the above-described method in which the desired sound data are previously stored in the ROM of the audio output device, a large memory capacity of ROM is required to output various sound. Further, once the sound data are written to the ROM, it is significantly difficult to add new sound data to the ROM or change the sound data stored in the ROM.

SUMMARY

The present disclosure provides a sine wave generating device capable of generating a sine wave having an arbitrary frequency to generate a desired audio data, such as a melody sound, and a digital signal processor and an audio output device utilizing the sine wave generating device.

According to some embodiments, there is provided a sine wave generating device including at least one adder configured to add two input signals thereof, at least one delay unit configured to delay an input signal thereof by one sample time and at least one multiplier configured to receive the delayed signal from the at least one delay unit, multiply the delayed signal by a coefficient and output the multiplied signal to the at least one adder. The sine wave generating device may generate a sine wave having a desired frequency based on the coefficient arbitrarily set from outside the sine wave generating device.

According to some other embodiments, there is provided a digital signal processor including the sine wave generating device and an impulse generator configured to generate an impulse signal. The sine wave generating device may be configured to output a sine wave signal as an impulse response when the impulse signal is applied from the impulse generator to the sine wave generating device.

According to still other embodiments, there is provided an audio output device including the sine wave generating device or an audio output device including the digital signal processor.

According to some embodiments, there is provide a sine wave generating device capable of generating a sine wave having an arbitrary frequency to generate a desired melody sound etc., and a digital signal processor and an audio output device using the sine wave generating device.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 4A illustrates an example of a sine wave of 1 kHz and 0 dB at a sampling rate of 48 kHz, according to some embodiments. FIG. 4B illustrates an example of a sine wave for outputting a “Do” scale (220.0 Hz) tone at the sampling rate of 48 kHz, according to some embodiments. FIG. 4C illustrate an example of a sine wave for outputting a “Re” scale (246.942 Hz) tone at the sampling rate of 48 kHz, according to some embodiments. FIG. 4D illustrates an example of a sine wave for outputting a “Mi” scale (277.183 Hz) tone at the sampling rate of 48 kHz, according to some embodiments.

DETAILED DESCRIPTION

Reference will now be made in detail to various embodiments, examples of which are illustrated in the accompanying drawings. In the following detailed description, numerous specific details are set forth in order to provide a thorough understanding of the inventive aspects of this disclosure. However, it will be apparent to one of ordinary skill in the art that the inventive aspect of this disclosure may be practiced without these specific details. In other instances, well-known methods, procedures, systems, and components have not been described in detail so as not to unnecessarily obscure aspects of the various embodiments.

Comparative Example

Figure 1:
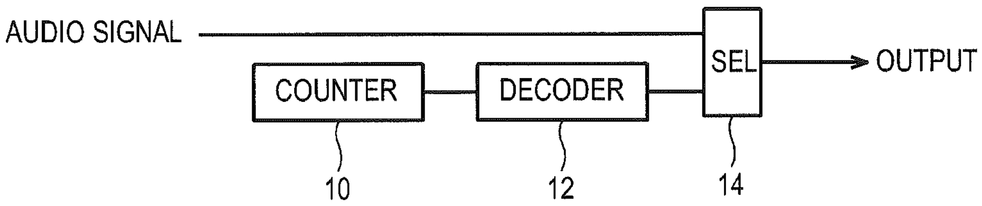
FIG. 1 illustrates a schematic block diagram of a sine wave generating device according to a comparative example.

FIG. 1 illustrates a schematic block diagram of a sine wave generating device according to a comparative example.

The sine wave generating device of FIG. 1 includes a counter 10, a decoder 12 and a selector (SEL) 14. The counter 10 receives a clock signal, for example, from an oscillator (not shown) and counts a counter value. The output of the counter 10 is coupled to provide an input to the decoder 12. The counter value may be a value that is changed at every sampling frequency.

Figures 2A, 2B:
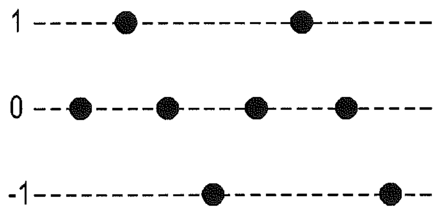
FIG. 2A illustrates an example of a relationship between a counter value and a decode value when a sine wave of 12 kHz is generated at a sampling rate of 48 kHz by using the sine wave generating device shown in FIG. 1.
FIG. 2B illustrates an example of a sine wave of 12 kHz generated at a sampling rate of 48 kHz by using the sine wave generating device shown in FIG. 1.

The decoder 12 generates a decode value corresponding to the counter value as illustrated in FIG. 2A and generates a sine wave form as shown in FIG. 2B. FIG. 2A illustrates an example of a relationship between the counter value and the decode value when a sine wave of 12 kHz is generated at a sampling rate of 48 kHz by using the sine wave generating device of FIG. 1. FIG. 2B illustrates an example a sine wave of 12 kHz generated at the sampling rate of 48 kHz by using the sine wave generating device of FIG. 1. The counter 10 counts the counter value at every 1/48000 second and outputs the counter value of "0"→"1"→"2"→"3"→"0" repeatedly. The decoder 12 generates the decode value based on the counter value output from the counter 10 and outputs a decode value at every 1/48000 second to generate the sine wave of 12 kHz.

The sine wave data generated by the decoder 12 is provided as an input to the selector 14. The selector 14 appropriately selects the sine wave data received from the decoder 12 or an input audio signal and selects one to output as audio data.

However, in some embodiments, the sine wave generating device of FIG. 1 may require as many decoders 12 as the number of frequencies to be generated, which may increase the circuit scale and the design time. Further, it is difficult to add or change audio data having an arbitrary frequency after the sine wave generating device is completed.

(Sine Wave Generating Device)

Figure 3:
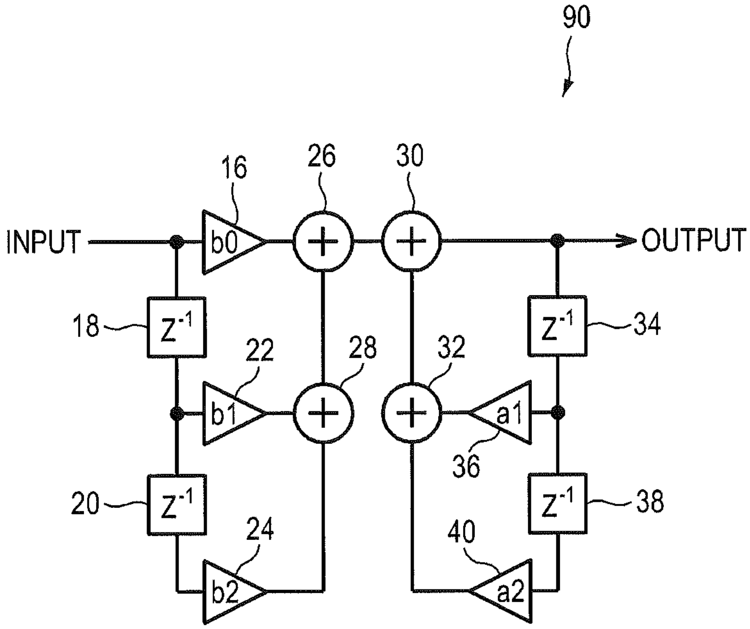
FIG. 3 illustrates a schematic block diagram of an example configuration of a sine wave generating device, according to some embodiments.

FIG. 3 illustrates a schematic block diagram of a configuration of a sine wave generating device 90 according to some embodiments.

As shown in FIG. 3, the sine wave generating device 90 may be configured to utilize, for example, a second-order IIR (infinite impulse response) digital filter (bi-quad filter) that forms a parametric equalizer circuit.

The sine wave generating device 90 may also include adders 26, 28, 30 and 32 configured to add two received signals (impulse signals), delay units 18, 20, 34 and 38 configured to delay received signals by one or more sample periods (e.g., one unit of sample time being $Z^{-1}$), multipliers 16, 22, 24, 36 and 40 configured to multiply received signals by coefficients and output the multiplied signals to the adders 26, 28, 30 and 32. In the sine wave generating device 90, a sine wave having a desired frequency can be generated based on the coefficients that are arbitrarily set from outside the sine wave generating device 90.

In operation, in a direct-input pass of the sine wave generating device 90, the multiplier 16 multiplies the input signal by a coefficient b0 and outputs the multiplied signal to the adder 26. The output of the adder 26 is provided as the input to the adder 30.

In a feed-forward pass of the sine wave generating device 90, the multiplier 22 multiplies the input signal delayed by one sample time by a coefficient b1 and outputs the multiplied signal to the adder 28. Having more than one delay unit in the signal path results in applying more than one delay time to the signal. Thus, the multiplier 24 multiplies the input signal delayed by two sample times (via the delay units 18 and 20) by a coefficient b2 and outputs the multiplied signal to the adder 28. The output of the adder 28 is provided as the input to the adder 26.

In a feed-back pass of the sine wave generating device 90, the multiplier 36 multiplies the signal output from the adder 30 and is delayed by one sample time by a coefficient a1 to output the multiplied signal provided to adder 32. The multiplier 40 multiplies the input signal delayed by two sample times by a coefficient a2 and outputs the multiplied signal to provide to the adder 32. The output of the adder 32 is provided as the input to the adder 30.

The five coefficients b0, b1, b2, a1 and a2 of the filter can be set from outside the sine wave generating device 90. By using this function, a filter type, a frequency, a Q value and a gain can be freely set. The filter type may include a peaking filter, a low-shelf filter and a high-shelf filter. For example, a sine wave of a desired frequency can be generated by arbitrarily setting the coefficients b0, b1, b2, a1 and a2.

Though the sine wave generating device 90 shown in FIG. 3 is formed by one parametric equalizer circuit, the sine wave generating device 90 may utilize a plurality of parametric equalizer circuits. For example, the sine wave generating device 90 may be a three-band parametric equalizer using three parametric equalizer circuits or a seven-band parametric equalizer using seven parametric equalizer circuits. In addition, the numbers of the coefficients, feed-back passes and feed-forward passes are implementation dependent.

Examples of the coefficients b0, b1, b2, a1 and a2 for generating the sine wave form by using the sine wave generating device 90 according to some embodiments is further be described below.

$$b0=0$$

$$b1=\sin(2\pi FT)$$

$$b2=0$$

$$a1=2\cos(2\pi FT)$$

$$a2=-1$$

Herein, F denotes a frequency of the sine wave and T denotes a sampling frequency.

In case of generating a sine wave form of 1 kHz at a sampling rate of 48 kHz by using the coefficients b0, b1, b2, a1 and a2 for example, the following values may be applied to the coefficients b0, b1, b2, a1 and a2.

$$b0=0$$

$$b1=\sin(2\pi\times1000/48000)=0.130526165220125$$

$$b2=0$$

$$a1=2\cos(2\pi\times1000/48000)=1.98288972985684$$

$$a2=-1$$

Further, in case of generating a sine wave form of a "Do" scale (220.0 Hz) tone at the sampling rate of 48 kHz by using the coefficients b0, b1, b2, a1 and a2 for example, the following values may be applied to the coefficients b0, b1, b2, a1 and a2.

$$b0=0$$

$$b1=\sin(2\pi\times220/48000)=0.0287939463795079$$

$$b2=0$$

$$a1=2\cos(2\pi\times220/48000)=1.9991707367325$$

$$a2=-1$$

Figure 4A:
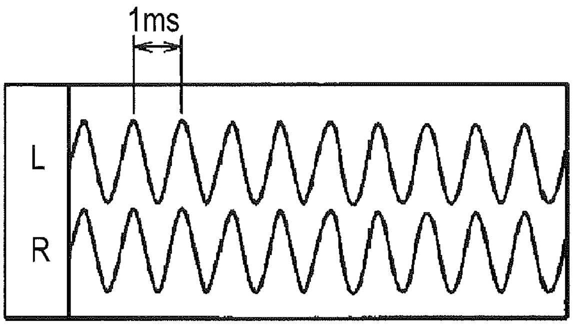
FIGS. 4A to 4D illustrate examples of sine waves generated by using the sine wave generating device according to some embodiments.
Figure 4B:
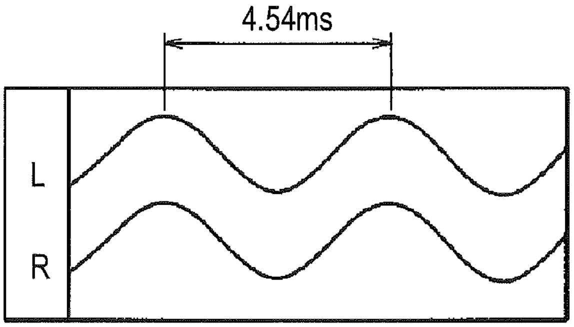
Figure 4C:
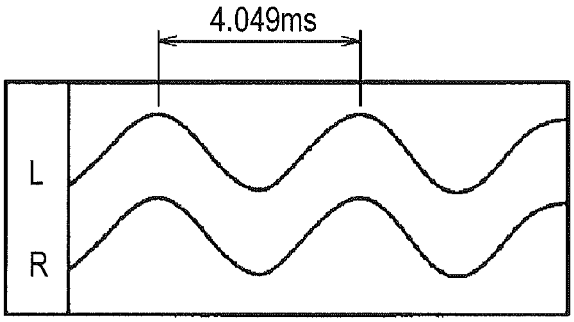
Figure 4D:
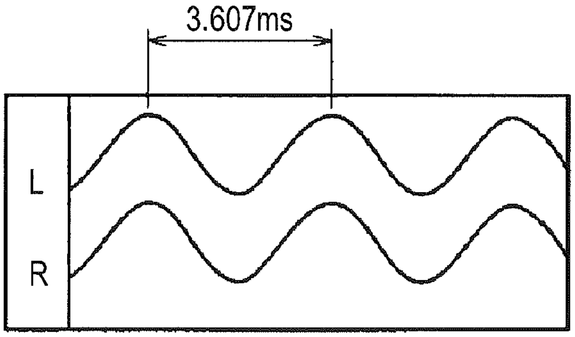

FIGS. 4A to 4D illustrate examples of sine waves generated by using the sine wave generating device 90 according to some embodiments. FIG. 4A illustrates an example sine wave of 1 kHz and 0 dB at a sampling rate of 48 kHz. FIG. 4B illustrates an example sine wave for outputting a "Do" scale (220.0 Hz) tone at the sampling rate of 48 kHz. FIG. 4C illustrates an example sine wave for outputting a "Re" scale (246.942 Hz) tone at the sampling rate of 48 kHz. FIG. 4D illustrates an example sine wave for outputting a "Mi" scale (277.183 Hz) tone at the sampling rate of 48 kHz.

(Digital Signal Processor)

Figure 5:
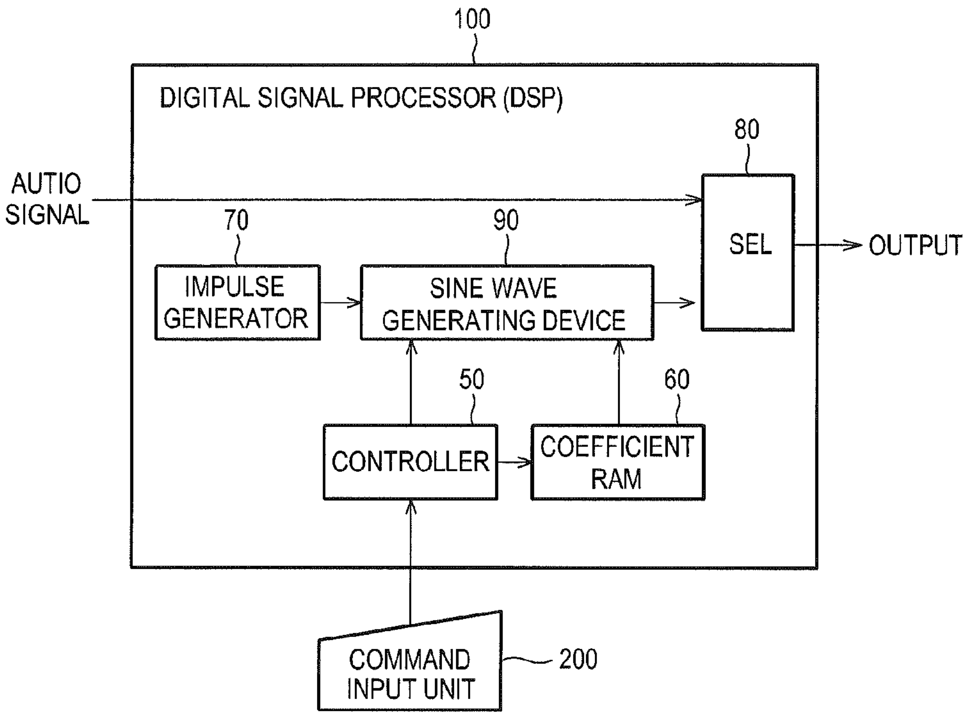
FIG. 5 illustrates an example schematic block diagram of a configuration of a digital signal processor having a sine wave generating device of FIG. 3, according to some embodiments.

FIG. 5 illustrates an example schematic block diagram of a configuration of a digital signal processor 100 that includes the sine wave generating device 90 shown in FIG. 3.

The digital signal processor 100 according to some embodiments includes the sine wave generating device 90, a controller 50, a coefficient RAM 60, an impulse generator 70 and a selector (SEL) 80.

The sine wave generating device 90 outputs a sine wave signal as an impulse response when the impulse signal is applied from the impulse generator 70. The five coefficients b0, b1, b2, a1 and a2 of the sine wave generating device 90 can be directly set from outside the sine wave generating device 90 (for example, the coefficients b0, b1, b2, a1 and a2 may be set by inputting a command by using a command input unit 200). The coefficients b0, b1, b2, a1 and a2 set from outside are stored in the coefficient RAM 60. The digital signal processor 100 may have an automatic update function of the coefficient RAM 60, which allows the coefficient RAM 60 to be automatically updated. By using the automatic update function, a filter type, a frequency, a Q value and a gain can be freely set. The filter type may include a peaking filter, a low-shelf filter and a high-shelf filter. A sine wave of a desired frequency can be generated by arbitrarily setting the coefficients b0, b1, b2, a1 and a2. The controller 50 analyzes the command received from the command input unit 200 to perform a control operation such as storing the coefficients b0, b1, b2, a1 and a2 in the coefficient RAM 60 or reading the coefficients b0, b1, b2, a1 and a2 from the coefficient RAM 60 and providing the coefficient data to the sine wave generating device 90.

The sine wave data generated by the sine wave generating device 90 is provided to the input of the selector 80. The selector 80 appropriately selects the sine wave data received from the sine wave generating device 90 or an input audio signal, e.g. responsive to a condition or state determined by whether the audio output device is powered on/off or mode-switched, and selects one to output as audio data.

The digital signal processor 100 that includes the sine wave generating device 90 according some embodiments can be assembled into, for example, an audio output device capable of generating a sine wave of an arbitrary frequency to generate a desired melody sound.

The sine wave generating device 90 may utilize any type of a parametric equalizer circuit, such as one that may be customized for a sine wave generating device in particular, but parametric equalizer circuits generally used in assembling digital signal processors or audio output devices can be also used.

As described above, unlike sine wave generating devices that utilize multiple decoders 12, decoders 12 as many as the number of frequencies to be generated are not required in the sine wave generating device 90 and the digital signal processor 100 using the sine wave generating device 90 of FIGS. 3 and 5, respectively. Thus the circuit scale and the design time can be reduced with the sine wave generating device 90 configurations of FIGS. 3 and 5. Further, in the sine wave generating device 90 and the digital signal processor 100 using the sine wave generating device 90 according to some embodiments, audio data of an arbitrary frequency can be easily added or changed after the completion of the sine wave generating device 90, the digital signal processor 100 or an audio output device configured to have the same.

Furthermore, according to the sine wave generating device 90 and the digital signal processor 100 including the sine wave generating device 90 of some embodiments, an audio IC characteristics evaluation, for example, can be performed at a sine wave of an arbitrary frequency without using an external oscillator and the like.

Furthermore, if the sine wave generating device 90 and/or the digital signal processor 100 including the sine wave generating device according to some embodiments are mounted on an audio output device, sound data can be added or changed by inputting a command from outside the system. Thus, the audio output device such as a television and an audio device can output colorful melody sounds when the audio output device is powered on/off or mode-switched, without previously storing audio data such as a melody in a ROM or the like.

According to some embodiments, there is provided a sine wave generating device capable of generating a sine wave of an arbitrary frequency to generate a desired melody sound and the like, and a digital signal processor and an audio output device using the sine wave generating device.

The sine wave generating device and the digital signal processor using the sine wave generating device, according to some embodiments, can be widely applied to an audio output device such as a television, a radio, a radio-cassette, a car audio, a home theater system and an audio component, a cellular phone, an electronic instrument and the like.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions, combinations and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A digital signal processor, comprising:

a sine wave generating device comprising: at least one adder configured to add two input signals thereof; at least one delay unit configured to delay an input signal thereof by one sample time and at least one multiplier configured to receive the delayed signal from the at least one delay unit, multiply the delayed signal by a coefficient and output the multiplied signal to the at least one adder, wherein the coefficient is arbitrarily set from outside the sine wave generating device; and an impulse generator configured to generate an impulse signal, wherein the sine wave generating device is configured to output a sine wave signal as an impulse response when the impulse signal is applied from the impulse generator to the sine wave generating device.

2. A digital signal processor, comprising:

a sine wave generating device comprising: at least one adder configured to add two input signals thereof; at least one delay unit configured to delay an input signal thereof by one sample time and at least one multiplier configured to receive the delayed signal from the at least one delay unit, multiply the delayed signal by a coefficient and output the multiplied signal to the at least one adder, wherein the coefficient is arbitrarily set from outside the sine wave generating device, wherein the sine wave generating device includes a parametric equalizer circuit; and an impulse generator configured to generate an impulse signal, wherein the sine wave generating device is configured to output a sine wave signal as an impulse response when the impulse signal is applied from the impulse generator to the sine wave generating device.

3. A digital signal processor, comprising:

a sine wave generating device comprising: at least one adder configured to add two input signals thereof; at least one delay unit configured to delay an input signal thereof by one sample time and at least one multiplier configured to receive the delayed signal from the at least one delay unit, multiply the delayed signal by a coefficient and output the multiplied signal to the at least one adder, wherein the coefficient is arbitrarily set from outside the sine wave generating device, wherein the sine wave generating device includes a parametric equalizer circuit having an infinite impulse digital filter; and an impulse generator configure to generate an impulse signal, wherein the sine wave generating device is configured to output a sine wave signal as an impulse response when the impulse signal is applied from the impulse generator to the sine wave generating device.

4. The digital signal processor of claim 1, further comprising:

a coefficient RAM configured to store the coefficient arbitrarily set from outside the sine wave generating device, wherein the sine wave generating device is configured to output the sine wave signal by using the coefficient stored in the coefficient RAM.

5. The digital signal processor of claim 2, further comprising:

a coefficient RAM configured to store the coefficient arbitrarily set from outside the sine wave generating device, wherein the sine wave generating device is configured to output the sine wave signal by using the coefficient stored in the coefficient RAM.

6. The digital signal processor of claim 3, further comprising:

a coefficient RAM configured to store the coefficient arbitrarily set from outside the sine wave generating device, wherein the sine wave generating device is configured to output the sine wave signal by using the coefficient stored in the coefficient RAM.

7. The digital signal processor of claim 4, wherein the coefficient stored in the coefficient RAM is automatically updated when the coefficient is updated by a coefficient input external to the sine wave generating device.

8. The digital signal processor of claim 5, wherein the coefficient stored in the coefficient RAM is automatically updated when the coefficient is updated by a coefficient input external to the sine wave generating device.

9. The digital signal processor of claim 6, wherein the coefficient stored in the coefficient RAM is automatically updated when the coefficient is updated by a coefficient input external to the sine wave generating device.

10. An audio output device comprising the digital signal processor of claim 1.

11. An audio output device comprising the digital signal processor of claim 2.

12. An audio output device comprising the digital signal processor of claim 9.

* * * * *